INVENTOR.
Carl Bramming

Aug. 9, 1966
C. BRAMMING
3,265,486
AUTOMATIC FLAME REGULATOR FOR GLASS
FORMING AND WELDING MACHINE
Filed Feb. 15, 1963
4 Sheets-Sheet 2
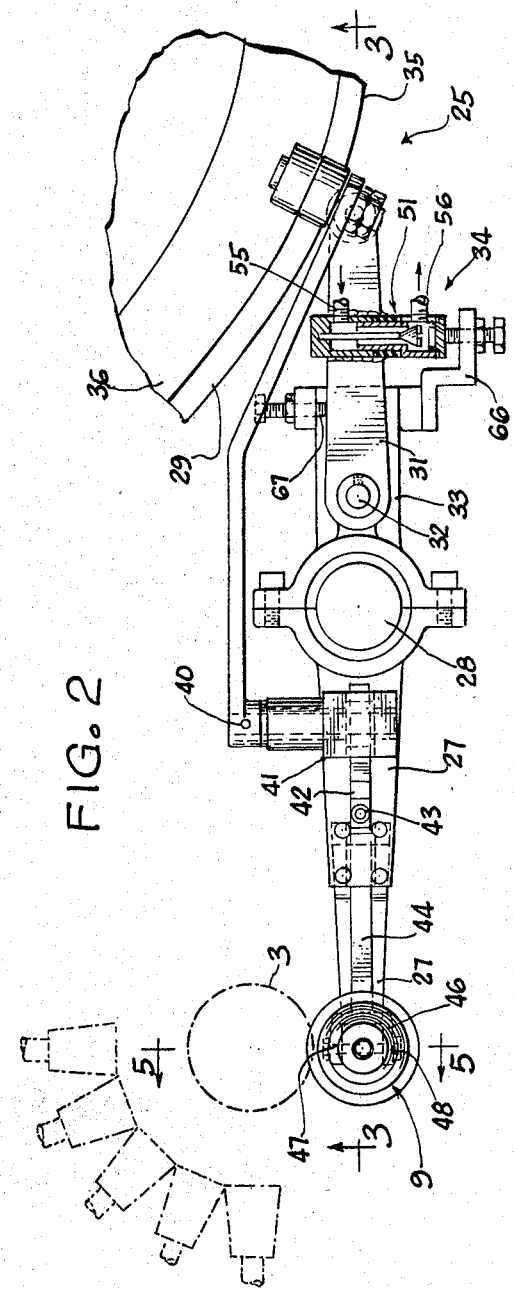
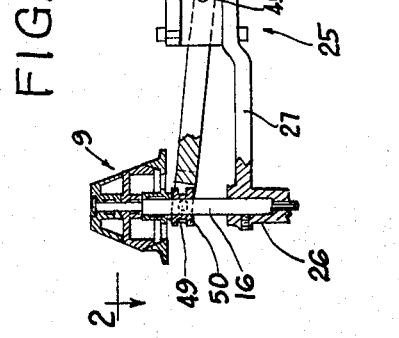
INVENTOR.
Carl Bramming
BY
Ooms, McDougall and Hersh
Att'ys

United States Patent Office 3,265,486
Patented August 9, 1966

3,265,486
AUTOMATIC FLAME REGULATOR FOR GLASS FORMING AND WELDING MACHINE
Carl Bramming, Palm Desert, Calif., assignor to Aladdin Industries, Incorporated, Chicago, Ill., a corporation of Illinois
Filed Feb. 15, 1963, Ser. No. 258,878
12 Claims. (Cl. 65—162)

This invention relates to machines for heating and forming articles made of glass or the like.

One object of the present invention is to provide a new and improved device for automatically regulating the heat supplied to the glass so that the glass is softened to the extent necessary to complete the desired forming operation on the glass.

A further object is to provide a new and improved regulating device of the foregoing character in which the heat is regulated by automatically adjusting the amount of gas or other fuel supplied to the flames employed to heat the glass.

Another object is to provide a new and improved regulator of the foregoing character in which the heat of the flames employed to soften the glass is automatically increased if the glass offers more than the normal resistance to the action of the tool employed to form the glass.

A further object is to provide a new and improved regulator having a roller or other tool for carrying out the forming operation on the glassware, a power member operable by a cam or the like for advancing the roller, a yieldable linkage between the power member and the roller, and a valve or other control device connected to said linkage and adapted to increase the heat supplied to the glassware in response to any yielding of the linkage.

It is a further object to provide a regulator of the foregoing character which will adjust the heat supplied to the glass so as to compensate for variations in the thickness of the glass, whereby the glass will be softened to the desired extent, despite such variations in thickness.

Another object is to provide a new and improved regulator which will avoid both oversoftening and undersoftening of the glass, so that breakage of the glass and faulty work will be obviated.

Further objects and advantages of the present invention will appear from the following description, taken with the accompanying drawings, in which:

FIG. 2 is a fragmentary plan view showing additional details of the forming machine and the automatic regulator, the view being partly in section along the line 2—2 in FIG. 3.

FIG. 3 is a fragmentary elevational view, partly in section, along the line 3—3 in FIG. 2.

Figure 1:
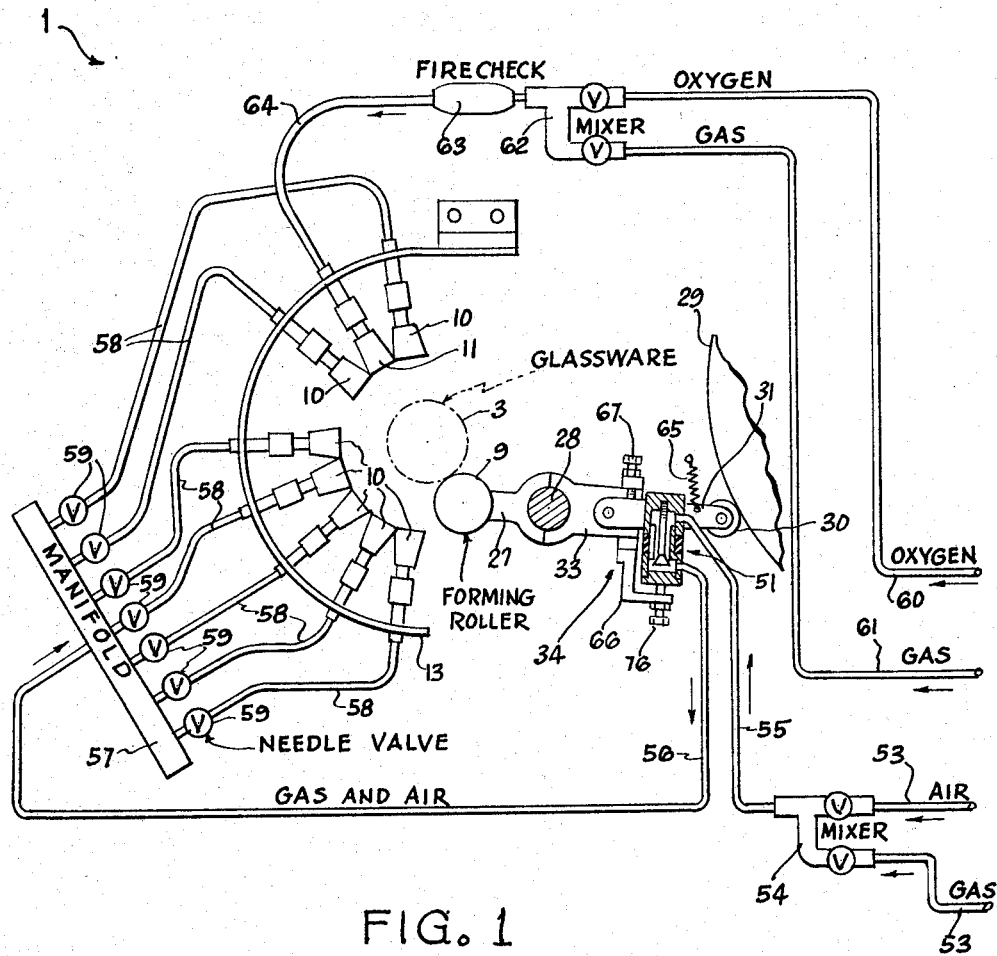
FIG. 1 is a fragmentary diagrammatic plan view of a glass forming and welding machine equipped with an automatic flame regulator to be described as an illustrative embodiment of the present invention.

The present invention is applicable generally to machines adapted to carry out forming operations of the type in which heat is supplied to the object to be formed while the forming operation is being carried out. Such forming operations are frequently employed in the manufacture of glassware of various kinds. Thus, it is merely by way of example that the drawings illustrate the invention as applied to a machine 1 for carrying out forming and welding operations in the manufacture of double-walled glass fillers 2 for vacuum bottles or the like. As will be seen from FIGS. 5 and 6, the filler 2 is bottle-shaped and comprises outer and inner walls 3 and 4 made of glass or the like. In the finished filler, the space 5 between the walls 3 and 4 is evacuated to provide efficient insulation which will greatly restrict the passage of heat into or out of the filler, so that the filler may be employed advantageously for keeping liquids hot or cold. Initially, the outer wall 3 has a mouth portion 6 which is substantially cylindrical so that the outer wall or shell 3 may readily be slipped over the inner wall 4. During the forming operation, the mouth portion 6 of the outer shell 3 is softened by the application of heat and is formed inwardly to a reduced diameter. The circular edge 7 of the outer shell 3 is pressed against and welded to the circular edge 8 of the inner shell 4. Both of the edges 7 and 8 are heated so that the welding operation may be carried out.

In the illustrated machine 1, the forming operation is carried out by pressing a forming roller 9 against the mouth portion 6 while rotating the roller 9 and also the glass walls or shells 3 and 4. Immediately before and during the forming operation, heat is applied to the mouth portion 6 of the outer shell 3 and also to the edge portion 8 of the inner shell 4, by means of flames produced by a series of burners 10 and 11. As shown in FIG. 1, the burners 10 and 11 may be arranged in a semicircular or other suitable pattern around the outer shell 6.

The forming machine 1 is of the type having a rotary turret 12 which carries the glass shells 3 and 4 along a circular path while the forming and welding operations are being carried out. The burners 10 and 11 are mounted on a suitable supporting member 13 secured to the rotary turret 12.

Suitable means are provided for rotatably supporting the glass shells 3 and 4 on the turret 12 so that the shells may be rotated on the turret about the common vertical axis of the shells. Thus, as diagrammatically indicated in FIGS. 5 and 6, the outer and inner shells 3 and 4 are supported by outer and inner chucks or holders 14 and 15 which are rotatably mounted on the turret 12 and are suitably driven so that the shells 3 and 4 will be rapidly rotated. In this way, the entire periphery of the mouth portions 6 and 8 of the outer and inner shells 3 and 4 will be heated by the flames of the burners 10 and 11.

The forming roller 9 is mounted on a spindle 16 which is suitably driven so that the roller 9 will be rapidly rotated during the forming operation. The roller 9 is carried along by the rotary turret 12 but is adapted to be translated both along its axis and transverse to its axis during the forming operation.

The illustrated roller 9 has a bulging annular portion 17 which is adapted to be pressed against the softened mouth portion 6 to form a reduced neck portion 18 on the finished filler 2. Above the bulging portion 17, the roller 9 has a tapering frustoconical portion 19 adapted to form a tapering portion 20 on the outer wall 3 of the finished filler. Below the bulging portion 17, the roller 9 has a curving annular portion 21 which tapers inwardly, along a portion 22 and then flares outwardly, along a portion 23, to mesh with an outwardly projecting annular flange 24 at the lower end of the roller 9.

Figure 5:
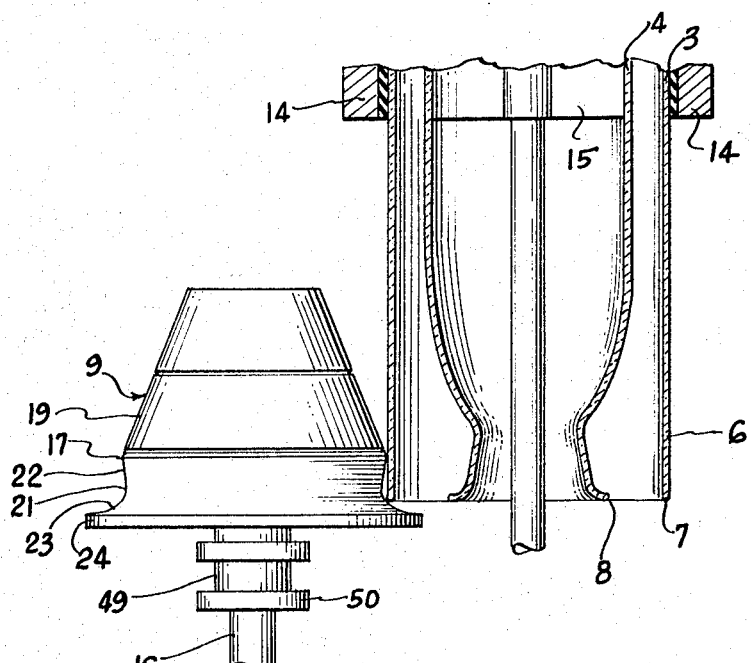
FIGS. 5 and 6 are elevational sectional views showing two different stages of the forming and welding operations carried out by the forming machine.
Figure 6:
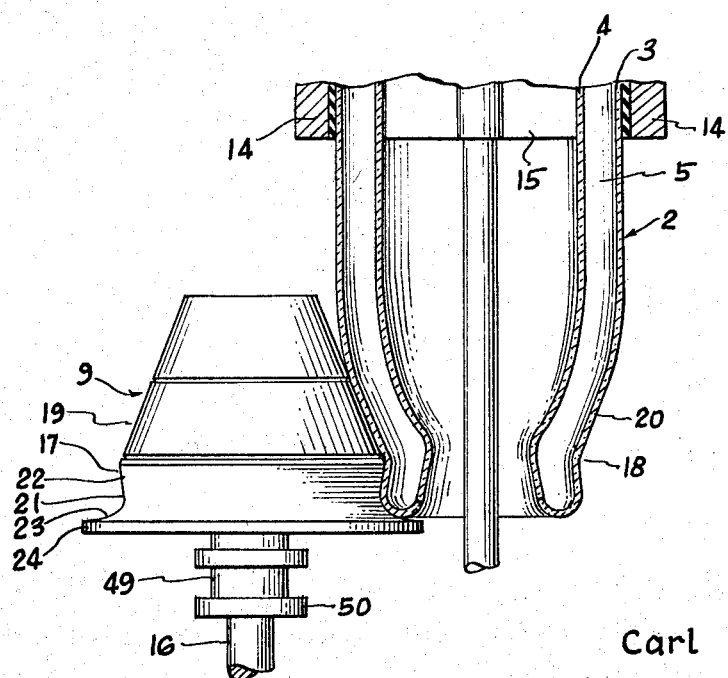

During the forming operation, the roller 9 is translated transversely to its axis, so as to form the softened mouth portion 6 inwardly. The roller 9 is also translated upwardly along its own axis so that the curving annular portion 21 of the roller will curl the edge portion 7 of the outer wall inwardly against the edge portion 8 of the inner wall 4. The pressure exerted by the roller 9 produces a weld between the heated edge portions 7 and 8. FIG. 5 illustrates the initial position of the roller 9, as it is beginning to engage the mouth portion 6 of the outer shell 3. FIG. 6 illustrates the final position of the roller 9 after it has been translated to the right and upwardly so as to complete the forming and welding operations.

FIGS. 2 and 3 illustrate details of a mechanism 25 for translating the forming roller 9 relative to the turret 12 during the forming operation. As shown, the spindle 16 of the roller 9 may be rotatably mounted in a bearing member 26 supported on a swingable arm 27 which is secured to a shaft 28. It will be understood that the shaft 28 is rotatably mounted on the turret 12. A stationary cam 29 may be provided to translate the roller 9 transversely to its axis against the glass shell 3. As shown, the cam is engaged by a roller 30 mounted on an arm 31. By means of a pivot 32, the arm 31 is mounted on an arm 33 which is secured to the shaft 28. As will be described in greater detail shortly, an automatic regulator mechanism 34 is connected between the arms 31 and 33 so as to transmit the movement of the arm 31 to the arm 33.

As shown in FIG. 2, the cam 29 has a gradually rising portion or lobe 35 which causes the roller 31 to swing in a clockwise direction. By means of the regulator mechanism 34, this movement of the arm 31 is transmitted to the arm 33, which in turn transmits it to the shaft 28 and the arm 27 so that the roller 9 is moved inwardly against the glass shell 3.

The roller 9 is adapted to be translated axially by a second stationary cam 36 which faces upwardly, as seen in FIG. 2. The cam 36 is engaged by a follower roller 37, which is mounted on an arm 38. The cam 36 has a rising portion or lobe 39 whereby the roller 37 and the arm 38 are moved upwardly.

In this case, the arm 38 is secured to a horizontal pivot shaft 40 which is rotatably mounted in a bearing member 41 secured to the arm 27. An arm 42 is also secured to the shaft 40 and thus is adapted to swing with the arm 38. In this case, an adjustable screw threaded thrust rod 43 is mounted on the arm 42 and extends downwardly therefrom into engagement with one end of a lever 44 which is mounted on the arm 27 by means of a horizontal pivot pin 45. The other end of the lever 44 extends outwardly above the arm 27 and is provided with a yoke 46. Inwardly directed pivot pins 47 and 48 are mounted on the yoke 46 at diametrically opposite points and are received in a groove 49 formed in a thrust collar 50 which is secured to the spindle 16 for the forming roller 9.

When the arm 38 is swung upwardly by the rising lobe 39 of the cam 36, the lever 44 is swung in a clockwise direction by the push rod 43. Such movement of the lever 44 translates the roller 9 upwardly in an axial direction. Of course, the lobes 35 and 39 of the cams 29 and 36 are coordinated so that the roller 9 is translated transversely and axially at the proper rates to carry out the forming operation to best advantage.

The automatic regulator mechanism 34 is adapted to regulate the rate at which heat is supplied to the glass shells 3 and 4 during the forming operation. If any unusual or abnormal resistance is encountered to the translation of the roller 9, the regulator 34 increases the supply of heat so that the glass will be softened to a greater extent. In this way, the glass shell 3 is softened to the extent necessary to allow the forming roller to carry out the forming operation without undue resistance. Thus, the regulator is adapted to compensate for variations in the thickness of the glass and other factors which tend to cause variations in the extent to which the glass is softened.

In this case, the automatic regulator 34 comprises a valve 51 adapted to regulate the supply of fuel to the burners 10. While any suitable fuel could be employed, the illustrated burners 10 are adapted to be supplied with gas derived from a supply pipe 52. Air from a compressed air line 53 is combined with the gas in a mixing valve 54. The mixture of gas and air is carried to the regulating valve 51 by a pipe or conduit 55. From the mixing valve 51, the mixture is carried by a pipe 56 to a manifold 57. Individual pipes 58 extend from the manifold 57 to the burners 10. A separate regulating valve 59 may be connected into each pipe 58 to regulate the amount of fuel and air supplied to each burner 10. Thus, the size and intensity of the flame produced by each burner may be controlled.

In this case, the burner 11 is not subject to regulation by the valve 51. To produce a particularly hot flame, the burner 11 is supplied with pure oxygen, rather than air, derived from a supply pipe 60. Gas for the burner 11 is derived from a supply pipe 61. The gas and the oxygen are combined in a mixing valve 62. The mixture of gas and oxygen is conducted from the mixing valve 62 through a fire check 63 and a pipe 64 to the burner 11.

The roller 30 may be biased against the cam 29 by a return spring 65 connected between the arm 31 and the turret 12. When the forming roller 9 encounters little or no resistance, the regulator mechanism 34 causes the arms 31 and 33 to swing in unison, without any substantial relative movement therebetween. Thus, the valve 51 is connected between the arm 31 and a bracket 66 on the arm 33. The valve 51 is adapted to transmit clockwise force between the arm 31 and the bracket 66, but is yieldable to permit a limited amount of relative clockwise movement between the arm 31 and the bracket 66 if the forming roller 9 encounters unusually great resistance. When the arm 31 moved counterclockwise by the return spring 65, the arm engages an adjustable stop screw 67 mounted on the arm 33. The stop screw 67 causes the arm 33 to move counterclockwise with the arm 31.

Figure 4:
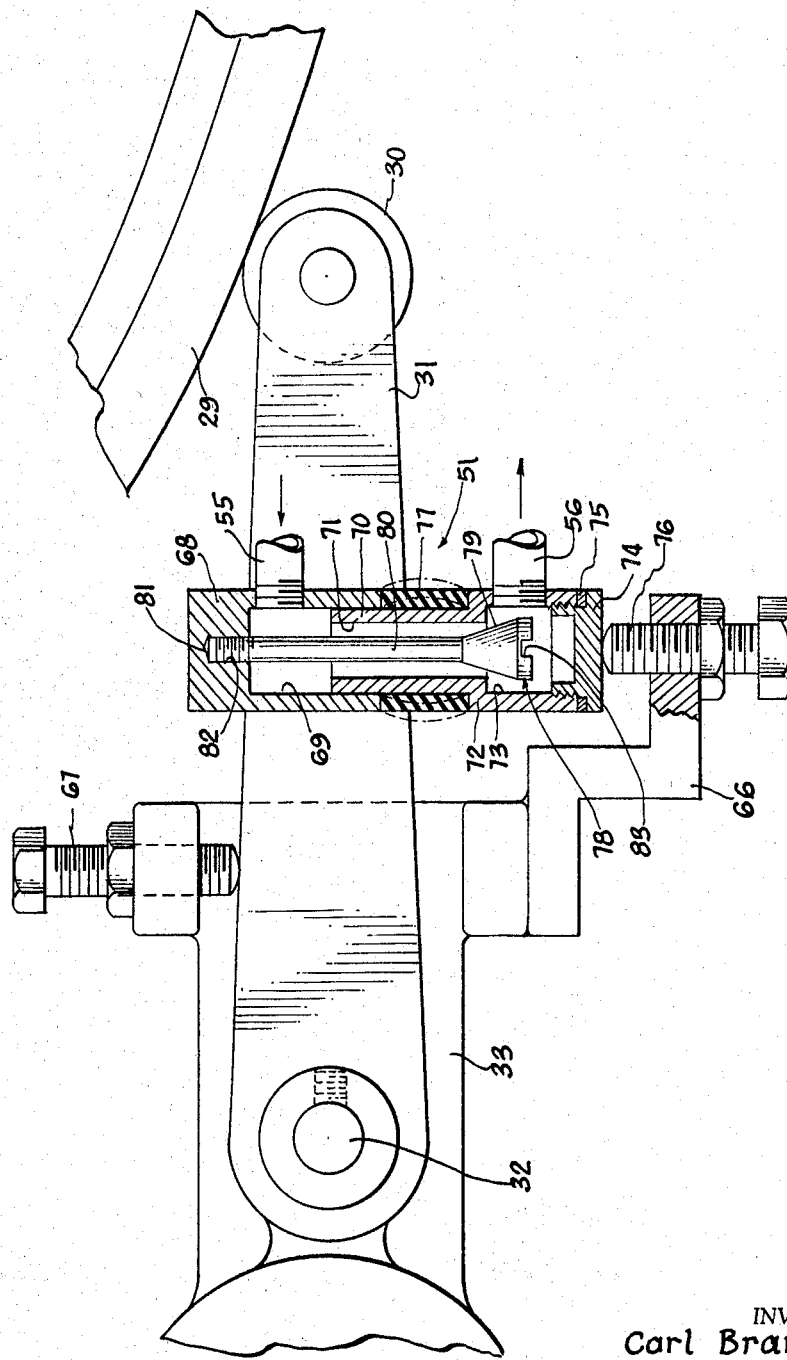
FIG. 4 is an enlarged fragmentary view corresponding generally to the right-hand portion of FIG. 2.

As shown to best advantage in FIG. 4, the illustrated valve 51 has a body or sleeve member 68 which is rigidly secured to the arm 31. A bore 69 is formed within the sleeve member 68. It will be seen that the inlet fuel pipe 55 connects with the closed end of the bore 69.

A bushing 70 is slidably received within the open end of the bore 69. A smaller bore or opening 71 extends longitudinally through the bushing 70.

The other end of the bushing 70 connects with an enlarged member 72 having an enlarged bore 73 therein. It will be seen that the outlet fuel pipe 56 connects with the enlarged bore 73. Thus, the mixture of fuel and air is adapted to pass from the pipe 55 through the bores 69, 71 and 73 into the fuel pipe 56.

The outer end of the bore 73 is closed with a plug or other suitable closure 74 which preferably screws into the bore so that the plug will be easily removable. A gasket 75 may be provided between the plug 74 and the member 72. As shown, the plug 74 is engaged by a stop screw 76 on the bracket 66. The screw 76 may be adjusted to take up any slack between the valve and the bracket 66.

In order that the valve 51 may be yieldable, a yieldable or resilient member 77 is connected between the sleeve member 68 and the enlarged portion 72 of the bushing 70. In this case, the member 77 takes the form of a sleeve or collar made of rubber or soft resilient rubberlike material. The sleeve 77 not only acts as a spring between the valve members 68 and 70, but also provides a seal between such members to prevent the escape of the combustible mixture flowing through the valve.

To regulate the flow of the combustible mixture, the valve 51 is provided with a valve member or plug 78 having a tapering frustoconical portion 79 which is positioned in one end of the bore 71 in the bushing 70. The valve member 78 is mounted on a rod or stem 80 secured to the valve body 68 and extending axially along the bore 71. Preferably, the stem 80 has a threaded end portion 81 which is screwed into a threaded bore 82 formed in the body 68. In this way, the position of the valve member 78 may be adjusted, if desired, by turning the valve member. To facilitate such adjustment and also to provide for easy removal of the valve member 78, a screw driver slot 83 is formed in the valve member opposite the removable plug 74. When the plug 74 is removed, the valve member 78 may be unscrewed and removed.

When the rubber sleeve 77 is not subject to substantial compression, it is substantially cylindrical in shape, as shown in full lines in FIG. 4. The sleeve 77 maintains the members 68 and 70 in such a relation that a tapered portion 79 of the valve member 78 partially obstructs the bore 71 and thereby limits the flow of the combustible mixture through the bore 71 to the gas burners 10. Any desired degree of initial compression may be imposed upon the rubber sleeve 77 by adjusting the stop screw 76.

During the forming operation, as already indicated, the arm 31 is swung in a clockwise direction by the cam 29. If the forming roller 9 does not encounter resistance, the arm 33 swings in unison with the arm 31 so that there is no substantial change in the condition of the valve 51.

However, if the forming roller 9 encounters abnormal resistance, due to insufficient softening of the glass shell 3 by the heat of the burner flames, the clockwise movement of the arm 31 will exceed the movement of the arm 33, with the result that the valve sleeve 68 will be moved to a greater extent over the valve bushing 70. Such relative movement between the members 68 and 70 compresses the rubber sleeve 77 and causes it to bulge outwardly, as shown in broken lines in FIG. 4. Inasmuch as the valve member 78 is mounted on the valve sleeve 68, any relative movement between the valve sleeve 68 and the bushing 70 causes the tapering portion 79 of the valve member to move part way out of the bore 71. In this way, the opening between the bore 71 and the tapered member 79 is increased in size so that the valve 51 will afford decreased resistance to the flow of the combustible mixture. Accordingly, the combustible mixture will flow to the burners 10 at an increased rate, with the result that the heat of the burner flames will be increased. Thus, the glass shell 3 will be softened to a greater extent so as to facilitate the forming operation. The greater the resistance encountered by the forming roller 9, the greater will be the increase in the flow of fuel to the burners 10.

Thus, the automatic heat regulator of the present invention insures that the glassware will be heated sufficiently to soften the glassware to the desired extent. The regulator compensates for various factors, such as variations in the thickness of the glass, which tend to affect the extent to which the glass is softened by the burner flames. It will be apparent that the regulator eliminates or greatly reduces the breakage or spoilage of the glassware during the heating and welding operations. Moreover, the facility, quality and uniformity of the operations are considerably improved.

Various other modifications, alternative constructions and equivalents may be employed without departing from the true spirit and scope of the invention, as exemplified in the foregoing description and defined in the following claims.

I claim:

1. In a machine for forming glassware, the combination comprising a plurality of gas burners for heating and softening the glassware,
a forming roller engageable with the glassware to carry out a forming operation,
a cam for moving said roller against the glassware,
a lever supporting said forming roller,
a swingable arm having a roller engaging said cam,
a valve forming an operating link between said arm and said lever,
a conduit system directing gas through said valve to said burners,
said valve having a first member secured to said arm and a second member secured to said lever,
one of said members including a sleeve member and the other of said members including a bushing member slidably received within said sleeve member,
a compressible rubber sleeve disposed between said sleeve member and said bushing member,
said bushing member having a bore therein through which the gas is conducted,
and a valve member connected to said sleeve member and having a tapered portion extending part way into said bore in said bushing member for progressively opening said bore in response to relative movement between said sleeve member and said bushing member so as to compress said rubber sleeve,
said valve thereby being effective to increase the flow of gas to said burners if said forming roller encounters substantial resistance during the forming operation.

2. In a machine for forming glassware,
the combination comprising a heater for heating and softening the glassware,
a movable forming tool engageable with the glassware,
a first movable member supporting said tool,
a second movable member,
power means for moving said second movable member,
resiliently yieldable means connected between said first and second movable members for operating said first movable member while providing for relative movement between said first and second members in the event that said forming tool encounters resistance,
and a heat regulating device connected to said heater for increasing the amount of heat produced by said heater in response to any such relative movement between said first and second members so as to produce an additional softening effect upon the glassware in the event that the forming tool encounters resistance to the forming operation.

3. In a machine for forming glassware or the like,
the combination comprising a burner for heating and thereby softening the glassware,
a movable forming tool for engaging the glassware,
a first movable member supporting said forming tool,
a second movable member,
power means for operating said second movable member,
resilient means connected between said first and second members for operating said first member in response to movement of said second member while providing for relative movement between said first and second members in the event that said forming tool encounters resistance to the forming operation,
and a regulating valve connected to said burner and operable in response to any such relative movement between said first and second members to increase the supply of fuel to said burner and thereby cause additional softening of said glassware.

4. In a machine for carrying out a forming operation on a workpiece,
the combination comprising a heater for heating the workpiece so as to soften the workpiece,
a forming tool engageable with said workpiece,
a first movable member supporting said forming tool for movement against said workpiece,
a second movable member,
power means for moving said second movable member,
resiliently yieldable means connected between said first and second members for moving said first member in response to movement of said second member while providing for relative movement between said first and second members in the event that said forming tool encounters resistance during the forming operation, and heat regulating means connected to said heater and responsive to any such relative movement between said first and second movable members for increasing the heat developed by said heater and thereby softening the workpiece to an additional extent.

5. In a machine for forming a workpiece, the combination comprising a burner for heating and thereby softening the workpiece, a forming tool engageable with the workpiece for carrying out a forming operation, a movable supporting member supporting said forming tool for movement against the workpiece, a movable actuating member, power means for moving said actuating member, and a regulating device forming an actuating connection between said actuating member and said supporting member, said regulating device comprising yieldable means providing for relative movement between said actuating member and said supporting member in the event that said forming tool encounters resistance during the forming operation, said regulating device comprising a regulating valve connected to said burner, said valve having relatively movable operating members connected between said actuating member and said supporting member for adjusting the flow of fuel to said burner in response to any relative movement between said actuating member and said supporting member.

6. In a machine for forming a workpiece made of glass or the like, the combination comprising a burner for heating the workpiece so as to soften the workpiece, a forming tool engageable with the workpiece for carrying out a forming operation, a supporting member movably supporting said forming tool, a movable actuating member, means for moving said actuating member, and a regulating valve forming an operating connection between said actuating member and said supporting member, said regulating valve comprising first and second relatively movable control members connected between said actuating member and said supporting member, resilient means resisting movement between said first and second members, means connecting said valve to said burner to control the supply of fuel to said burner, and means operable in response to relative movement between said first and second control members for increasing the supply of fuel to the burner and thereby heating the workpiece to an additional extent to facilitate the forming operation.

7. In a machine for carrying out a forming operation on a workpiece, the combination comprising a heater for heating the workpiece so as to soften the workpiece, a forming tool engageable with said workpiece, a first movable member for effecting relative movement between said forming tool and said workpiece, a second movable member, power means for moving said second movable member, resiliently yieldable means connected between said first and second members for moving said first member in response to movement of said second member while providing for relative movement between said first and second members in the event that said forming tool encounters resistance during the forming operation, and heat regulating means connected to said heater and responsive to any such relative movement between said first and second movable members for increasing the heat developed by said heater and thereby softening the workpiece to an additional extent.

8. In a machine for forming a workpiece, the combination comprising a burner for heating and thereby softening the workpiece, a forming tool engageable with the workpiece for carrying out a forming operation, a first movable member for effecting relative movement between said forming tool and said workpiece to bring said tool against the workpiece, a movable actuating member, power means for moving said actuating member, and a regulating device forming an actuating connection between said actuating member and said first member, said regulating device comprising yieldable means providing for relative movement between said actuating member and said first member in the event that said forming tool encounters resistance during the forming operation, said regulating device comprising a regulating valve connected to said burner, said valve having relatively movable operating members connected between said actuating member and said first member for adjusting the flow of fuel to said burner in response to any relative movement between said actuating member and said first member.

9. In a machine for forming a workpiece made of glass or the like, the combination comprising a burner for heating the workpiece so as to soften the workpiece, a forming tool engageable with the workpiece for carrying out a forming operation, a supporting member movably supporting said forming tool, a movable actuating member, means for moving said actuating member, and a regulating valve forming an operating connection between said actuating member and said supporting member, said valve including means connecting said valve to said burner to control the supply of fuel to said burner, said valve including means operable in response to relative movement between said members for increasing the supply to fuel to the burner and thereby heating the workpiece to an additional extent to facilitate the forming operation.

10. In a machine for forming a workpiece, the combination comprising a heater for heating and softening the workpiece, a movable forming tool engageable with the workpiece, a mechanism for effecting relative movement between said tool and the workpiece to bring the tool against the workpiece, and a heat regulating device responsive to relative movement in said mechanism for increasing the amount of heat produced by said heater so as to soften the workpiece to an additional extent in the event that the forming tool encounters resistance to the forming operation.

11. In a machine for forming a workpiece, the combination comprising a heater for heating and softening the workpiece, a movable forming tool engageable with the workpiece, yieldable means for effecting relative movement between said forming tool and the workpiece to bring said forming tool against the workpiece, and a heat regulating device responsive to yielding action in said yieldable means for increasing the amount of heat produced by said heater to produce an additional softening effect upon the workpiece in the event that the forming tool encounters abnormal resistance to the forming operation.

12. In a machine for forming a workpiece,
the combination comprising a heater for heating and softening the workpiece,
a movable forming tool engageable with the workpiece,
yieldable means for effecting relative movement between said forming tool and the workpiece to carry out the forming operation,
and means responsive to the yielding action in said yieldable means during the forming operation for regulating the amount of heat produced by said heater.

References Cited by the Examiner

UNITED STATES PATENTS

| | | | |
|---|---|---|---|
| 1,695,848 | 12/1928 | Higgins | 251—335 |
| 1,906,315 | 5/1933 | Davis et al. | 65—109 X |
| 2,779,564 | 1/1957 | Press | 251—263 X |
| 2,835,079 | 5/1958 | Camarata et al. | 65—272 |

DONALL H. SYLVESTER, *Primary Examiner.*

A. D. KELLOGG, *Assistant Examiner.*